Aug. 15, 1944.  E. KLAFSTAD  2,355,916
RELIEF VALVE
Filed Dec. 15, 1941

Witness
Charles T. Olson

Inventor
Erling Klafstad
by his attorney
Fish Hildreth Cary&Jenney

Patented Aug. 15, 1944

2,355,916

UNITED STATES PATENT OFFICE 2,355,916

RELIEF VALVE

Erling Klafstad, Belmont, Mass., assignor to Crosby Steam Gage & Valve Company, Boston, Mass., a corporation of Massachusetts Application December 15, 1941, Serial No. 422,974

2 Claims. (Cl. 137—53)

The present invention relates to relief valves, and more particularly to safety valves to be used on lines containing steam or other fluid at very high pressures.

A form of safety valve found to be reasonably satisfactory is that shown in the Gentzel patent, No. 2,021,773, and my prior patent, No. 2,101,682. In the construction of these patents, the valve disk assembly comprises a disk proper, which is mounted on a holder, the latter being designed for sliding movement within a guide sleeve or cylinder. The valve disk is provided at the top with a button having an accurately machined surface which engages the bottom surface of a hardened steel insert in the holder. The valve disk is held in the holder by means of a pin passed through the button.

Although this construction has proved highly satisfactory in most cases, it has been found that in some instances the disk has not seated accurately and some leakage has occurred, with consequent destructive "wire drawing." I have discovered that this difficulty is usually due to a very slight misalignment or inaccuracy in the button or insert, or in the engagement between these parts, whereby the valve disk may become slightly cocked. It will be understood that the actual load on the seating surface is comparatively small under normal conditions, since the lifting force of the steam and the seating force of the spring are nearly in balance. The forces acting on the button and the disk insert, however, are very much greater, and will accentuate any tendency toward misalignment. Therefore, even if the button and the insert are finished perfectly with respect to each other and with respect to the valve seating surface, any other irregularities, as in the spring or spindle, may cause enough inequality in loading at the seating surfaces to result in leakage.

The object of the present invention is to provide a modified safety valve construction, whereby the above-mentioned difficulties are avoided, with assurance of proper seating under substantially all conditions. With this object in view, the present invention comprises the safety valve hereinafter described and particularly defined in the claims.

Figure 1:
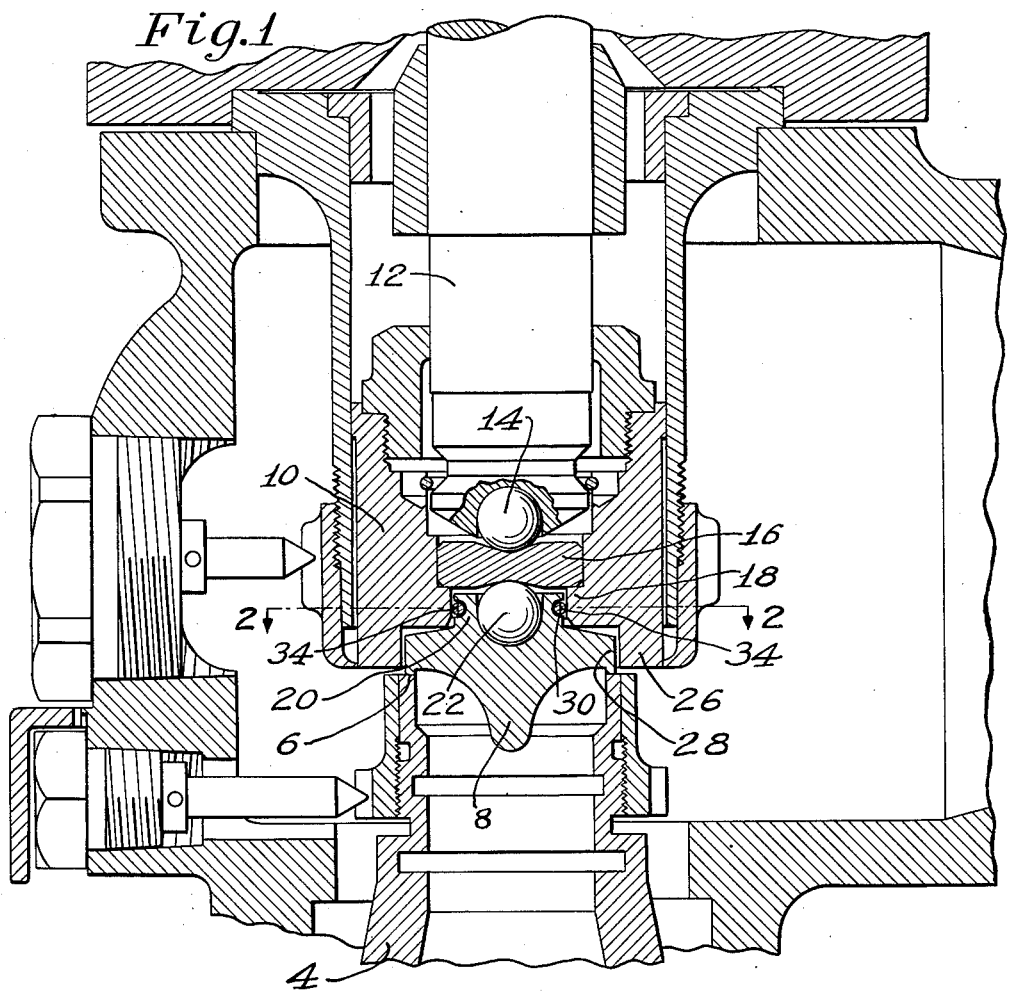
Figure 2:
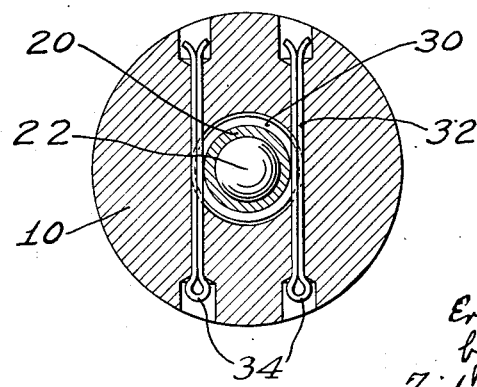

In the accompanying drawing, Fig. 1 is a sectional elevation of so much of a safety valve as is necessary for an understanding of the present invention; and Fig. 2 is a section on the line 2—2 of Fig. 1.

The safety valve shown in the drawing comprises the usual nozzle section 4, formed at its upper end with an accurately machined seat 6. Cooperating with the seat is a valve disk 8, which, together with a holder 10, comprises the valve disk assembly, in general similar to that described in my prior patent above referred to. The valve disk is normally held on its seat by a spring-loaded spindle, indicated at 12, and having at its lower end a ball 14 pressing against a hardened metal thrust block in the form of an insert 16 received in a counterbore near the bottom of the holder. The lower portion of the holder is formed with an inwardly extending flange portion 18, which receives an upwardly extending sleeve 20 on the valve disk 8. A ball member 22 is received in the sleeve by a press fit, and engages in a recess 24 of the hardened insert 16. As shown in Fig. 1, the disc 8 has slight clearance within the valve holder. The holder is formed with a skirt 26 enclosing the side wall 28 of the disk and extending close to the seating surface.

The sleeve 20 is provided with a circumferential groove 30, and the holder is provided with parallel straight grooves, or bores, 32 to receive cotter pins 34, which are engaged within the groove 30. Accordingly, the valve disk 8 has provision for free rotative movement and a limited swivelling movement in the holder. This provision for swivelling movement insures uniform seating of the disk on the valve seat, irrespective of any tilting or irregularity in any of the parts.

In the construction shown in my prior patent, the tolerances on critical parts were held to a fraction of a thousandth of an inch, but in high pressure work, it was occasionally found that some leakage would occur because of failure of the disk to seat with uniform pressure around its periphery. As noted above, the resultant seating force may be only a few pounds, while the forces acting on the parts themselves and thus tending to cause misalignment are many times greater.

According to the present invention, the disk accommodates itself to the forces acting on it in such a way that substantially uniform seating pressure is attained. The valve is free of leakage, and in all other respects has been found exceptionally reliable.

Having thus described my invention, I claim:

1. A relief valve comprising a casing, a valve seat, a valve spindle, and a valve disk assembly, said assembly comprising a valve disk and a valve disk holder, the holder being mounted in the casing for movement toward and from the valve seat, means for guiding said holder to prevent tilting movement thereof, a thrust member carried by the holder, a thrust ball between the spindle end and the thrust member, and a second ball between the other face of the thrust member and the valve disk, said ball members being substantially centered on the axis of the spindle and providing swivel connections between the parts adjacent the thrust balls.

2. A relief valve comprising a casing, a valve seat, a valve spindle, and a valve disk assembly, said assembly comprising a valve disk and a valve disk holder, the holder being mounted in the casing for movement toward and from the valve seat, means for guiding said holder to prevent tilting movement thereof, a thrust member carried by the holder, a thrust ball between the spindle end and the thrust member, and a second thrust ball between the other face of the thrust member and the valve disk, the thrust member having aligned recesses on its ball-engaging faces to center the thrust balls substantially on the axis of the spindle whereby the thrust of the spindle is transmitted to the valve disk along the spindle axis, said disk holder being constructed and arranged to determine the lateral position of the valve disk.

ERLING KLAFSTAD.